US005089316A

United States Patent [19]

Sasaki et al.

[11] Patent Number: 5,089,316

[45] Date of Patent: Feb. 18, 1992

[54] PLASTICS PRINTING MATERIAL AND IMAGE FIXING METHOD FOR ELECTROSTATIC PRINTING WITH USE OF SAME

[75] Inventors: Hiromi Sasaki, Suita; Masao Tojima, Amagasaki; Satsuko Konishi, Kobe; Hiroyuki Takana, Suita, all of Japan

[73] Assignee: Osaka Soda Co., Ltd., Osaka, Japan

[21] Appl. No.: 587,148

[22] Filed: Sep. 24, 1990

Related U.S. Application Data

[62] Division of Ser. No. 257,616, Oct. 14, 1988.

[30] Foreign Application Priority Data

Oct. 16, 1987 [JP] Japan ................ 62-262309
Mar. 23, 1988 [JP] Japan ................ 63-70310

[51] Int. Cl.[5] ................ B32B 3/00
[52] U.S. Cl. ................ 428/195; 428/500
[58] Field of Search ................ 428/195, 182, 500

[56] References Cited

U.S. PATENT DOCUMENTS 2,502,841 4/1950 Henderson ................ 428/195

FOREIGN PATENT DOCUMENTS 311997 4/1989 European Pat. Off. .
2-274745 11/1990 Japan .

*Primary Examiner*—Edith L. Buffalow
*Attorney, Agent, or Firm*—Armstrong, Nikaido, Marmelstein, Kubovcik & Murray

[57] ABSTRACT

The printing materials of the invention includes a film or sheet prepared from a chlorinated polyethylene containing 10 to 50 wt. % of chlorine and obtained by chlorinating a polyethylene having a molecular weight of 10,000 to 200,000, or from a polymer mixture containing the chlorinated polyethylene; a laminate comprising the film or sheet, and a base material; and a product prepared by impregnating or coating a base material with a solution of the chlorinated polyethylene or the polymer mixture. With the latter two printing materials, the surface of the film or sheet is used as the surface to be printed on. The image fixing method of the invention for use in producing copies by electrostatic printing comprises forming a toner image on one of these printing materials, and thereafter treating the printing material with heat at 160° to 250° C. for 5 to 30 seconds.

5 Claims, No Drawings

PLASTICS PRINTING MATERIAL AND IMAGE FIXING METHOD FOR ELECTROSTATIC PRINTING WITH USE OF SAME

This is a division of application Ser. No. 257,616 filed Oct. 14, 1988 pending.

BACKGROUND OF THE INVENTION

The present invention relates to materials to be printed on, i.e. printing materials, useful for printing processes such as gravure printing or like intalgo printing, offset printing or like planographic printing, letterpress printing and hot stamping and also for electrostatic printing. The invention further relates to a method of fixing images to the material for use in preparing copies by electrostatic printing.

The term "printing" as used herein and in the appended claims not only refers to the conventional printing processes wherein an image pattern bearing plate is prepared from an original illustration or document and ink is transferred from the plate onto the material to be printed by application of pressure, but also embraces electrostatic printing or copying processes wherein a colored powder, i.e. toner, is deposited on the material to be printed, electrostatically without the application of pressure and is further fixed thereto with heat.

Plastics heretofore known for use as printing materials are polyvinyl chloride, ethylene-vinyl acetate copolymer or like vinyl resin, polyethylene, polypropylene or like polyolefin resin, polyester resin, styrol resin, acrylic resin, etc. These resins are used singly, or in the of form of composite materials in combination with a base material such as paper, wood or plastics of different kind to provide the surface of the composite material to be printed on. Printing materials prepared from these resins are printed to provide prints which are used as book covers, wrappers and wallpapers and for various other products.

The conventional plastics printing materials are produced generally by processing such a resin into a film, laminating the resin to a base material or coating the base material with the resin. The material prepared under the conditions best suited to the contemplated printing process is used. Of the plastics printing materials, the material made of polyolefin resin is generally low in printability. Especially for use in electrostatic printing, this material is poor in polarity, is low in compatibility with the vehicle of the toner deposited thereon and therefore encounters difficulty in giving copy images with good stability. Accordingly, the material has the drawback that the printing surface must be modified chemically or physically and thereby improved in printability. Since polyvinyl chloride usually has incorporated therein a plasticizer for giving flexibility, the printing material of this resin has the drawback that the inks usable for printing are limited or that the sheets of this material cannot be held placed one over another owing to the presence of the plasticizer which bleeds with time. The print prepared using this printing material fails to remain stable with time, permits bleeding of the plasticizer which is liable to obscure or dislodge the printed image, and becomes smeared by other print, such as newspaper, placed thereon. The print is further not preservable permanently owing to UV-degradation. The ethylene-vinyl acetate copolymer used is usually one having a low vinyl acetate content in view of the softening point of the resin and the strength of the film or sheet prepared therefrom. However, the printing material made of such resin of low vinyl acetate content is low in flexibility and elasticity, accordingly fails to come into intimate contact with the printing plate and encounters difficulty in giving satisfactory prints. When the vinyl acetate content is increased to afford higher flexibility, the resin exhibits a lower melting point and is not processable properly, giving a film or sheet of lower strength. The printing material obtained releases the disagreeable odor of acetic acid with lapse of time and is not usable satisfactorily. The printing material made of polyester resin requires a chemical or physical surface treatment so as to be given improved printability. Since the resin per se has a high softening point and is hard and low in elasticity and adhesion, it is difficult to laminate the resin to other base materials and it is difficult to blend the resin with other resins owing to poor compatibility. Styrol and acrylic resin are hard, brittle and poor in adhesion, are not compatible with other resins and therefore cannot be universally used as printing materials.

Remarkable advances have recently been made in copying techniques, and the conventional monochromatic (black-and-white) copying operation is being changed over to full-color copying operation. Monochromatic copies are prepared usually by transferring black (carbon black) toner images onto a copying material. Color copies are made using toners of three colors, i.e. red (magenta), yellow (azo type) and blue (cyanine type), and in addition, black (carbon black) toner, that is, four kinds of toners. Such toners are superposed on a copy material to complete a copy with the color of the original reproduced with high fidelity.

With color copying techniques, the color or tone of the original is separated into three colors utilizing electronic techniques, and the color patterns are read as by a computer and are reproduced with transferred toners as superposed to reproduce the color of the original. Theoretically, black can be produced using the three colors, while it is also practice to add the black toner finally. Accordingly, when the image of the original includes more intermediate colors or blackish colors, more toners of different colors are superposed. Especially, the black area is produced by superposed four toner layers. In the area where different toners are superposed in a multiplicity of layers, the toner image is not always fixed firmly when instantaneously heated in the copying machine. This problem is experienced with the use of sheets other than the paper specified for plain paper copying (hereinafter abbreviated as "PPC"), especially plastics composite printing sheets which are not amenable to the adhesion of toners. If the copy is folded, crumpled or strongly rubbed, the copy image dislodges to expose the white surface of the sheet to impair the copy, so that the copy is not fully useful. Such a problem is experienced also with monochromatic copies although to a different extent.

SUMMARY OF THE INVENTION

In view of the foregoing problems, an object of the present invention is to provide a printing material which can be prepared advantageously, has good flexibility although free from any plasticizer, need not be surface-treated, yet possesses excellent printability and is suited to use in gravure printing or like intalgo printing, offset printing or like planographic printing, letterpress printing, hot stamping and like printing processes, the material further having outstanding printability for use in electrostatic printing.

Another object of the invention is to provide a method of fixing a copy image formed on the printing material by electrostatic printing, by treating the image under a specified condition so that the image can be fixed to the material with high bond strength and can be given resistance to abrasion, crumpling or creasing, smudge resistance and a glossy surface while assuring accurate reproduction of the original.

The printing material of the present invention is a film or sheet prepared from a chlorinated polyethylene having a chlorine content of 10 to 50 wt. % and obtained by chlorinating a polyethylene having a molecular weight of 10,000 to 200,000, or from a polymer mixture containing the chlorinated polyethylene; or a laminate comprising the film or sheet, and a base material; or a product prepared by impregnating or coating a base material with a solution of the chlorinated polyethylene or the polymer mixture.

The chlorinated polyethylene has a chlorine atom on the main polyethylene chain and is used as a polar substance for adhesives and coating compositions. Nevertheless, this compound has not been in actual use as a printing material, nor is it in any way known that the compound is useful as a printing material for electrostatic printing. The present invention has been accomplished based on the finding that the specified chlorinated polyethylene having the above characteristics is very suitable as a printing material for various printing processes.

The printing material of the invention is prepared from the above-specified chlorinated polyethylene or a polymer mixture containing the polyethylene and therfore has the following advantages.

Since the present printing material is made of the above polymer of mixture, the material has flexibility even when free from any plasticizer and is processable advantageously. The present printing material can be any of a film or sheet prepared from the chlorinated polyethylene or mixture, a laminate obtained by laminating the film or sheet to a base material of paper, fabric or the like, and a product prepared by dissolving the chlorinated polyethylene or mixture in an organic solvent and impregnating or coating a base or substrate of other material with the solution. Since the present printing material is made of a polar substance, the material has a printing surface which is printable by various processes without any pretreatment unlike conventional plastics printing materials. The printing material is especially excellent as a printing material for electrostatic printing, is amenable to a continuous printing operation like PPC paper and affords distinct color prints.

The image obtained by printing is an accurate reproduction of the original and remains fixed to the material with good stability. For example, when the printing material used is one prepared by the coating method using cotton cloth as the substrate, the print obtained by heat fixing retains the printed image free of dislodging even if creased by crumpling, while the printing material itself remains free of damage, and the creases can be easily eliminated by ironing. The printing material of the invention, which is free from any plasticizer, permits ink or toner to adhere thereto effectively and has none of the drawbacks due to the plasticizer that would bleed with time to obscure or dislodge the printed image and allow other print to adhere to and smudge the print. The print is therefore preservable permanently. The present printing material is also excellent in resistance to weather and water and in flame retardancy, retains the printed image thereon firmly and is suitable for posters, billboards and like prints which are to be used outdoors or in humid places, for example, in balneotherapeutic facilities. The print, which is highly flexible, can also be affixed to surfaces of various configurations.

For use in preparing copies by electrostatic printing, the present invention further provides a method of fixing images to the printing material, i.e. a film or sheet prepared from the above-mentioned chlorinated polyethylene or a colymer mixture containing the polyethylene, a laminate comprising the film or sheet and a base material, or a product prepared by impregnating or coating a base material with a solution of the chlorinated polyethylene or mixture. The method comprises forming a toner image on the printing material and thereafter treating the material with heat at 160° to 250° C. for 5 to 30 seconds.

The copy image formed on the printing material by the present image fixing method is distinct, is fixed to the material very firmly and remains free of dislodging even when subjected to severe adhesion tests such as peel test and folding test.

DESCRIPTION OF THE PREFERRED EMBODIMENTS

The chlorinated polyethylene suitable for use in the present invention is one containing 10 to 50 wt. %, preferably 20 to 45 wt. %, of chlorine and obtained by chlorinating a polyethylene having a molecular weight of 10,000 to 200,000, preferably 10,000 to 100,000, by the solution method or aqueous suspension method. In other words, the chlorinated polyethylene suitable for the printing material is prepared from a polyethylene having about 0.5 to about 4, preferably 1 to 3, chlorine atoms per 10 methylene groups thereof. If the polyethylene to be chlorinated is less than 10,000 in molecular weight, the printing material obtained is low in tensile strength and heat resistance, becomes tacky when heated and consequently causes trouble in the printing press. The material is low in strength and does not have satisfactory mechanical characteristics for printing. Conversely, when a polyethylene over 200,000 in molecular weight is used, the chlorinated polyethylene obtained is low in flowability when heated and can not be smoothly processed into films or the like. The polymer is further low in compatibility with other polymers, low in solubility in toluene or like organic solvent and difficult to dissolve therein to obtain a suitable solution for impregnation or coating. When the chlorinated polyethylene is less than 10 wt. % in chlorine content, the printing material prepared therefrom has no rubber-like elasticity and is low in compatibility with the printing ink, printability and solubility in organic solvents. Chlorine contents exceeding 50 wt. % are not desirable since the polymer then obtained is hard, has no elasticity, is less stable to heat and exhibits poor processability, giving a printing material which is not flexible.

One type of printing material of the invention is prepared from the chlorinated polyethylene or from a mixture of the chlorinated polyethylene and a polymer compatible therewith by admixing the desired additives therewith and making the resulting compound into a film or sheet. Examples of useful additives are filler, stabilizer, lubricant, pigment, antioxidant, flame retardant, vulcanizing agent, auxiliary vulcanizing agent and others which are generally used in the field of printing materials. The printing material of the invention is produced by preparing a compound in accordance with the processability of the contemplated printing materials, the chlorinated polyethylene or the polymer mixture containing the same, processing the compound into a film or sheet by inflation, extruder, calender, press or the like. It is also produced by laminating the film or sheet to a base material different from the polymer, or dissolving the compound in an oragnic solvent and impregnating or coating a base material different from the polymer with the solution.

Examples of useful polymers which are compatible with the chlorinated polyethylene are resins such as polyvinyl chloride, polyethylene, polypropylene, ethylene-vinyl acetate copolymer, ethylene-acrylic acid copolymer, ethylene-methacrylic acid copolymer, ethylene-acrylate copolymer, ethylene-methacrylate copolymer and acrylonitrile-butadiene-styrene copolymer, and rubbers such as chloroprene rubber, nitrile rubber, butadiene rubber, chlorosulonated polyethylene and epichlorohydrin rubber. The mixture of the chlorinated polyethylene and such a polymer contains at least 20 wt. %, preferably at least 30 wt. %, of the chlorinated polyethylene.

The printing material of the invention is suited for use in printing processes such as gravure printing or like intalgo printing, offset printing or like planographic printing, letterpress printing, hot stamping and electrostatic printing. Especially for use in electrostatic printing, it is desirable that the printing material have an insulation breakdown voltage of at least 500 V/mm and be prepared from an elastic chlorinated polyethylene or elastic polymer mixture thereof which is at least 100 $kg/cm^2$ in tensile strength, at least 100% in tensile elongation and at least 60° C. in softening point. This printing material is suited to electrostatic printing by the xerographic process, facsimile process, photo dielectric process and the like to give monochromatic to full-color prints prepared by the dry indirect method and bearing sharp images of exquisite patterns or characters. The images on these prints have very high stability and will not dislodge even when the print is crumpled or immersed in water.

The chlorinated polyethylene or the mixture containing the polyethylene, when less than 100 $kg/cm^2$ in tensile strength, gives a printing material which becomes locally unstable and is likely to be forced to break when to be discharged from the electrostatic printer, hence undesirable. When the polymer or the mixture is less than 100% in tensile elongation, the printing material obtained is not flexible, failing to intimately contact the printer and to give clear prints. While the toner image electrostatically formed is fixed to the printing material by heating at 160° to 250° C. for 5 to 30 seconds, the printing material becomes tacky and less likely to permit proper printing when the polymer is lower than 60° C. in softening point. Preferably, the chlorinated polyethylene or mixture has a tensile elastic modulus 100 (based on JIS K 6301) of up to $1\times10^2$ $kg/cm^2$ as a standard for elastic polymers. If the modulus is higher than this value, the toner image is formed on the material as stretched by pressing contact during printing, making it difficult to assure accurate reproduction of the original.

The electrostatic printing material obtained from the chlorinated polyethylene having the above characteristics or the mixture containing the same must be at least 500 V/mm in insulation breakdown voltage. If the voltage is lower than 500 V/mm, an insulation breakdown occurs owing to the application of voltage for printing, permitting a discharge to cause short-circuiting to damage the printer. The printing material then will not be fully charged, presenting difficulty in forming sharp images.

In addition to the film or sheet of the chlorinated polyethylene or a polymer mixture containing the same, the printing material of the invention can be in other forms such as a laminate prepared by laminating the film or sheet to a base material different from the polymer, and a product obtained by dissolving the chlorinated polyethylene or polymer mixture in an oragnic solvent and impregnating or coating a base material different from the polymer with the solution. The base material to be used is a sheet of a material selected from the group consisting of paper, and woven or nonwoven fabric of natural fiber, synthetic fiber, chemical fiber, mineral fiber or glass fiber, or a composite sheet comprising such sheets, the sheet or composite sheet being at least 500 V/mm in insulation breakdown voltage.

The thickness of the film or sheet of the chlorinated polyethylene or polymer mixture is determined suitably in accordance with the printing press or copying machine to be used, from the range of 20 to 200 micrometers. For preparing the impregnated or coated product, the base material is impregnated or coated with the chlorinated polyethylene or polymer mixture preferably in an amount of 5 to 200 $g/m^2$. The chlorinated polyethylene or polymer mixture can be vulcanized using a vulcaning agent. Depending on the contemplated use, vulcanization can be resorted to in order to achieve improvements in mechanical strength, repellent elasticity and heat resistance.

The image fixing method of the invention will be described next.

The image fixing method of the invention is used for producing copies by electrostatic printing. This method comprises forming a toner image on a printing material, i.e. a film or sheet prepared from the chlorinated polyethylene or a polymer mixture containing the polyethylene, a laminate comprising the film or sheet and a base material, or a product prepared by impregnating or coating a base material with a solution of the chlorinated polyethylene or the mixture, and thereafter treating the printing material with heat at 160° to 250° C. for 5 to 30 seconds.

The heating means to be used for fixing the toner image is, for example, a usual constant-temperature heater, heat roll, or a far infrared radiation heater having a reflector for passing the image-bearing printing material through a heated atmosphere. Such means can be adapted for use in a continuous operation wherein the printing material is treated as timed with the transport thereof in the copying machine.

The toner image is fixed at a temperature of 160° to 250° C. for a short period of time, for example, 5 to 30 seconds, preferably at a temperature of 170° to 220° C. for 5 to 30 seconds. When the temperature is not lower than 200° C., the fixing time may be several seconds. When the temperature is about 180° C., the preferred time is generally about 5 to about 20 seconds. At a temperature below 160° C., the image cannot be fixed effectively even if heated for a prolonged period of time. Conversely, temperatures exceeding 250° C. produce adverse effects such as degradation or discoloration of the print. Accordingly, the temperature must be in the range of 160° to 250° C.

Examples and comparative examples are given below to substantiate the advantages of the present invention.

In these examples, the following methods were used for testing the printing sheet for surface elasticity and printability, and for the peel test and folding test of the print. The fixability of the printed toner image was evaluated by the peel test and folding test.

SURFACE ELASTICITY

Determined by the feel of the printing sheet according to the following criteria.

A: The sheet feels soft and exhibits high elasticity when bent.
B: The sheet feels soft and is slightly elastic.
C: The sheet feels slightly hard and has no elasticity.
D: The sheet feels hard, has no softness and forms an unremovable fold when folded.

PRINTABILITY

The printed surface was observed visually to evaluate the printability according to the following criteria.

A: The print is entirely free from irregularities, and each character is disinct.
B: The print is generally acceptable in its entirety, but some characters are thin.
D: The characters are all illegible, and the print has unprinted blank areas.

PEEL TEST

A cellophane adhesive tape was affixed to the printed surface, then pressed against the printed image as by fingers and thereafter forcibly peeled off. The surface was then observed and evaluated according to the following criteria.

A: The tape bears no image portion, and no characters are removed from the printed surface.
B: The tape bears a pattern of the image area, and the image on the print becomes slightly thin.
C: The tape bears some image portions, with the image locally removed from the printed surface.
D: The image is entirely transferred from the printed surface to the tape.

FOLDING TEST

The print was folded with the printed surface inside or outside, and the folded portion was firmly nipped with fingers, which were then slidingly moved along the fold. After unfolding the print, the folded portion was observed and evaluated according to the following criteria.

A: No removal of the image.
B: One to 2% removal along the fold.
C: Up to 10% removal along the fold.
D: Up to 50% removal along the fold.
E: More than 50% removal along the fold.

EXAMPLES 1-5 AND COMPARATIVE EXAMPLE 1

Low-pressure polyethylene, 20,000 in molecular weight, as suspended in an aqueous medium was chlorinated to obtain rubberlike chlorinated polyethylene containing 35.1 wt. % of chlorine.

In Example 1, to the chlorinated polyethylene were added 0.5 part by weight of stabilizer and 1 part by weight of lubricant per 100 parts by weight of the polymer to prepare a compound, which was then kneaded with heat rolls and made into a sheet. A portion of the sheet was pressed hot using a die to obtain a 2-mm-thick sheet having a smooth surface.

The sheet obtained was tested for tensile strength and tensile elongation according to JIS K-6723, softening point by the ring-and-ball method and insulation breakdown voltage according to JIS C-2110. Table 1 shows the measurements obtained.

The same procedure as in Example 1 was repeated in Examples 2 to 5 except that the chlorinated polyethylene was replaced by polymer mixtures of the chlorinated polyethylene and the above-mentioned low-pressure polyethylene in the proportions listed in Table 1. Table 1 also shows the measurements obtained.

The same procedure as in Example 1 was repeated in Comparative Example 1 except that the low-pressure polyethylene only was used instead of the chlorinated polyethylene. Table 1 also shows the measurements obtained.

TABLE 1

| Proportions (parts by weight), or properties | Example 1 | 2 | 3 | 4 | 5 | Comp. Ex. 1 |
|---|---|---|---|---|---|---|
| Chlorinated polyethylene | 100 | 80 | 60 | 50 | 25 | — |
| Polyethylene | — | 20 | 40 | 5o | 75 | 100 |
| Tensile strength ($kg/cm^2$) | 133 | 170 | 212 | 233 | 253 | 330 |
| Tensile elongation (%) | 750 | 736 | 720 | 715 | 705 | 750 |
| Softening point (°C.) | 75 | 76 | 80 | 110 | 125 | 150 |
| Tensile elastic modulus 100 ($\times 10^2$ $kg/cm^2$) | 0.2 | 0.2 | 0.4 | 0.6 | 0.9 | 1.5 |
| Insulation breakdown voltage (kV/mm) | 19.0 | 19.0 | 19.0 | 18.5 | 18.0 | 18.5 |

The sheet obtained by kneading was made into pellets by pelletizer and thereafter made into a film with the thickness given in Table 2 using an inflation extruder. The film prepared from the chlorinated polyethylene only (Example 1) was semitransparent and had rubberlike elasticity. The film prepared from the low-pressure polyethylene only (Comparative Example 1) was transparent and had no rubberlike elasticity.

TABLE 2

| | Example 1 | 2 | 3 | 4 | 5 | Comp. Ex. 1 |
|---|---|---|---|---|---|---|
| Thickness of film (μm) | 40 | 40 | 42 | 41 | 40 | 40 |

Each of the films was placed over PPC paper (for copying machines of Fuji Xerox Co., Ltd.) with a chromium-plated sheet interposed their between, and the assembly was pressed hot to obtain a laminate sheet, which had a glossy resin surface. The greater the chlorinated polyethylene content, the higher were the flexibility and elasticity. The sheets thus prepared were 5.5 to 6.3 kV/mm in insulation breakdown voltage.

A picture or minute characters were copied on the resin surface of each laminate sheet by a copying machine, Xerox Model 4790. The print was tested for printability and subjected to the peel test with a cellophane adhesive tape. Table 3 shows the result.

TABLE 3

| | Example | | | | | Comp. Ex. |
|---|---|---|---|---|---|---|
| | 1 | 2 | 3 | 4 | 5 | 1 |
| Surface elasticity | A | A | B | B | C | D |
| Printability | A | A | A | A | B | D |
| Peel test | A | A | A | B | C | D |

EXAMPLE 6

Low-pressure polyethylene, 30,000 in molecular weight, as suspended in an aqueous medium was chlorinated to obtain rubberlike polyethylene containing 45.0 wt. % of chlorine.

To 100 parts by weight of the chlorinated polyethylene were added 0.5 part by weight of stabilizer and 1 part by weight of lubricant to prepared a compound, which was then kneaded with heat rolls and thereafter made into a sheet. Subsequently, a portion of the sheet was formed into a 2-mm-thick sheet by a heat press. The sheet was 83° C. in softening point, 190 kg/cm$^2$ in tensile strength, 420% in tensile elongation, $0.2\times10^2$ kg/cm$^2$ in tensile elastic modulus 100 and 19 kV/mm in insulation breakdown voltage.

To 100 parts of the above chlorinated polyethylene were added 6 parts by weight of titanium oxide, 30 parts by weight of heavy calcium carbonate, 1 part by weight of lubricant and 0.5 part by weight of stabilizer to obtain a compound, which was then kneaded with heat rolls and thereafter made into a sheet. The sheet was further made into pellets by a pelletizer, and the pellets were dissolved in toluene to obtain a solution having a concentration of 30 wt. %. To the solution were added 0.5 part by weight of a vulcanizing agent ("OF-100," product of Osaka Soda Co., Ltd.) and 1 part by weight of a vulcanization accelerator ("M-181," product of Osaka Soda Co., Ltd.) per 100 parts by weight of the pelletized material to prepare a coating composition.

A plain weave fabric (71 warps/inch, 65 wefts/inch, 85 g/m$^2$ in weight) made of cotton only was treated with starch on its rear side to close the openings, then leveled, coated over the front side thereof with the coating composition twice and dried by heating. A sheet of tissue paper (weighing 40 g/m$^2$) was laminated to the rear side of the coated sheet with a vinyl acetate adhesive to obtain a nontacky flexible sheet having a white front surface and lined with the paper.

The sheet thus prepared was 0.18 mm in thickness, 152 g/m$^2$ in weight, 40 g/m$^2$ in the weight of the coating and 6.8 kV/mm in insulation breakdown voltage. For reference, the PPC paper for electrostatic printers (NP5540) of Canon Inc. is 5.4 kV/mm in insulation breakdown voltage.

The printing sheet was cut to specified sizes (JIS B-5, JIS B-4 and DIN A-4), and a three-color image was printed on the cut sheets using an offset press (product of Roland), with the surface of the resin coating serving as the printing surface, giving color prints with sharp details. The prints were satisfactory and fully comparable to usual PPC paper prints.

The print was crumpled, but the sheet itself remained free of breakage. The print was immersed in water or hot water for 1 month, but the printed image remained free of discoloration or dislodgement. The creases created by crumpling were removable to restore the print to the original state.

EXAMPLE 7

Printing sheets were prepared in the same manner as in Example 6. A colorful flower pattern or illustration in the three colors of blue, yellow and red was photogravured on the resin coating of the sheets by a high-speed rotary press under the same conditions as used for usual gravure paper, whereby excellent prints were obtained.

When the printing sheet was heat-treated with heat press rolls and thereby given improved surface smoothness before gravure printing conducted in the same manner as above, a beautiful print was obtained with a glossy surface.

EXAMPLE 8

Printing sheets were prepared in the same manner as in Example 6 and used for hot stamping with a metal plate bearing the characters of the name of a company and a pattern. The hot stamping operation was conducted using gold and silver foils (products of Murata Kinpakusha for use with polyvinyl chloride) and a hot stamping press (Model VB-3, product of Taihei Kogyo Co., Ltd.) The prints obtained were subjected to a lattice pattern cutting test (JIS GO202) with a cellophane adhesive tape and thereby checked for the adhesion of the printed image. The test result was 100/100. The print was immersed in water for 1 month and thereafter weathered for 1 month but exhibited no changes.

EXAMPLE 9

A printing sheet prepared in the same manner as in Example 6 was cut to the sizes of DIN A-4, JIS B-5 and JIS B-4, and 20 to 30 cut sheets of each size were set in the box of specified size on an electrostatic printer (Model MP5540, product of Canon Inc.). A map, newspaper article or colorful pattern was electrostatically printed on the sheets by a continuous operation to test the sheet for copying properties. The continuous printing operation was conducted without any trouble as is the case with the use of PPC paper, affording sharp copies including three-color prints.

Table 4 shows the characteristics of the sheet of the invention and PPC paper.

TABLE 4

| | Sheet of the invention | | PPC paper | |
|---|---|---|---|---|
| Insulation breakdown voltage (kV/mm) | 6.8 | | 5.4 | |
| Charge potential (V) | 15 | | 1 | |
| Coefficient of friction | Static | Dynamic | Static | Dynamic |
| Between printing surfaces | 0.66 | 0.39 | — | — |
| Between printing surface and nonprinting surface | 0.45 | 0.30 | 0.47 | 0.36 |
| Between printing surface and SUS304 | 0.42 | 0.32 | | |
| Between nonprinting surface and SUS304 | 0.30 | 0.25 | 0.29 | 0.26 |

The charge potential in Table 4 was measured by the method of JIS L-1094-B. If the charge potential is great, printing sheets adhere to one another due to charging and are not usable for smooth continuous printing operation. The printing sheet of the invention is low in charge potential and is usable for continuous copying operation like PPC paper as will be apparent from the above table.

The coefficient of friction given in Table 4 was measured according to ASTM D1894. The term "static" in Table 4 refers to the coefficient of friction produced owing to acceleration when the printing sheet is mechanically drawn out from the accommodated position. The term "dynamic" refers to the coefficient of friction due to frictional resistance occurring at a constant speed.

The printing sheet of the invention and PPC paper were tested for heat resistance with the results given in Table 5.

The test was conducted on the assumption that the electrostatic printer will develop heat trouble. With electrostatic printers, the temperature of the heat press roller assembly for fixing the toner is generally in the range of 160° to 185° C. although somewhat different depending on the type of the printer. If the printer develops trouble during toner fixing, the printing sheet will be heated to a considerably high temperature. Simulating such a case, the present test was conducted at a high temperature of 200° C. for 1 minute. The specimen was dried in a silica gel desiccator for 48 hours before testing.

With reference to Table 5, the specimen (10 g) was used for the analysis of evolved chlorine gas according to JIS K-0102, and the gas was detected by colorimetric analysis with o-tolidine. The thermally cracked gas was produced by the following procedure using "Curie Point Pyrolyzer," product of Nippon Bunsekikogyo Co., Ltd. A ferromagnetic material having a Curie point of 177° C. or 225° C. was caused to support the specimen thereon and melted using a high-frequency heat source. The gas evolved by thermal cracking at a specified temperature during melting was analyzed by gas chromatography.

TABLE 5

| | Sheet of invention | PPC paper |
|---|---|---|
| Weight reduction due to heating at 200° C. for 1 minute (%) | 0.11 | 0.13 |
| Evolved Cl gas | Not detected | Not detected |
| Evolution of thermally cracked gas | | |
| 177° C. | No decomposed component | No decomposed component |
| 255° C. | Small amounts of 2 components of low boiling point | Small amounts of 2 components of low boiling point |

The results given in Tables 4 and 5 indicate that the printing sheet of the invention are usable for electrostatic printing like common PPC paper.

COMPARATIVE EXAMPLE 2

The same heat roll kneading procedure as in Example 6 was repeated with the exception of using an ethylene-vinyl acetate copolymer ("EVAFLEX P2505," containing 25 wt. % of vinyl acetate, product of Mitsui Du Pont Chemical Co., Ltd.) in place of the chlorinated polyethylene of Example 6. The heat rolls were used at a reduced temperature of 60° C. The polymer was highly viscous and not readily releasable from the rolls and gave off the odor of decomposition product of acetic acid. A 2-mm-thick sheet was prepared from the kneaded compound by a heat press. The sheet was 200 kg/cm$^2$ in tensile strength, 700% in tensile elongation, 165° C. in softening point and 21 kV/mm in insulation breakdown voltage.

A coating composition in the form of a toluene solution with a concentration of 30 wt. % was prepared from the sheet in the same manner as in Example 6. A white printing sheet with a coating weighing 37 g/m$^2$ was prepared in the same manner as in Example 6 by coating a cotton fabric with the composition. The coated sheet was relatively lightweight, but was low in rubberlike elasticity, had a tacky surface and was in no way usable for printing.

EXAMPLE 10

Low-pressure polyethylene, 120,000 in molecular weight and suspended in an aqueous medium, was chlorinated to obtain rubberlike chlorinated polyethylene containing 40.7 wt. % of chlorine. In the same manner as in Example 6, the polymer was kneaded and pressed hot to obtain a 2-mm-thick sheet. The sheet was 85° C. in softening point, 185 kg/cm$^2$ in tensile strength, 700% in tensile elongation, $0.4\times10^2$ kg/cm$^2$ in tensile elastic modulus 100 and 18.5 kV/mm in insulation breakdown voltage.

A compound was prepared from 100 parts by weight of the chlorinated polyethylene, 30 parts by weight of the same ethylene-vinyl acetate copolymer as used in Comparative Example 2, 10 parts by weight of titanium oxide, 2 parts by weight of Phthalocyanine Blue and 30 parts by weight of heavy calcium carbonate. The compound was kneaded with heat rolls and further pelletized.

A woven fabric (17 warps/inch, 17 wefts/inch) made of 1000-denier polyester filaments was topped over its opposite sides with the pelletized composition by a calender to obtain a flexible tarpaulin sheet 0.86 mm in thickness and 1200 mm in width. The sheet was blue and nontacky and had a tensile strength of 176 kg/cm$^2$ in the warp direction and 157 kg/cm$^2$ in the weft direction, and a tensile elongation of 16.5% in the warp direction and 24.9% in the weft direction. In the same manner as in Example 8, gold and silver foils were stamped on the sheet by a hot stamping press. When the sheet was subjected to a lattice pattern cutting test with an adhesive cellophane tape, the result achieved was 100/100, indicating satisfactory printability and adhesion.

COMPARATIVE EXAMPLE 3

High-pressure polyethylene, 5000 in molecular weight and suspended in an aqueous medium, was chlorinated to obtain rubberlike chlorinated polyethylene containing 38.0% of chlorine. The polymer was treated in the same manner as in Example 6 to prepare a 2-mm-thick sheet. The sheet was 51° C. in softening point, 72 kg/cm$^2$ in tensile strength, 630% in tensile elongation, $0.2\times10^2$ kg/cm$^2$ in tensile elastic modulus 100 and 13 kV/mm in insulation breakdown voltage.

The sheet was pelletized and made into a coating composition in the form of a toluene solution with a concentration of 30 wt. % in the same manner as in Example 6. The same cotton fabric as used in Example 6 was coated with the composition to obtain a white sheet which was 0.15 mm in thickness, 120 g/m$^2$ in weight and 35 g/m$^2$ in the weight of the coating. The coated sheet was 6.5 kV/mm in insulation breakdown voltage. The resin coating had a tacky surface. Accordingly, when the sheet was subjected to the same electrostatic printing process as in Example 9, the sheet was heated within the printer, adhered to and was wound around the fixing roller, and was in no way printable.

COMPARATIVE EXAMPLE 4

Low-pressure polyethylene, 30,000 in molecular weight and suspended in an aqueous medium, was chlorinated to obtain chlorinated polyethylene containing 6.0 wt. % of chlorine. The chlorinated polyethylene had no rubberlike elasticity ($1.2\times10^2$ kg/cm$^2$ in tensile elastic modulus 100) and was low in solubility in toluene and like organic solvents and also in compatibility with other polymers. The polymer was made into a film 42 micrometers in thickness, and the film was thermally bonded to PPC paper to obtain a laminate sheet. When the sheet was used for offset printing, the printed image formed was not distinct.

COMPARATIVE EXAMPLE 5

Low-pressure polyethylene, 240,000 in molecular weight was chlorinated to obtain chlorinated polyethylene containing 40.5 wt. % of chlorine. Although it was attempted to knead the polymer with heat rolls, the polymer had high viscoelasticity when hot and was not processable into any sheet. An attempt was made to blend the polymer with other polymers such as ethylene-vinyl acetate copolymer (containing 14%, 25% or 41% of vinyl acetate), vinyl chloride paste resin, polyethylene and polypropylene to give higher plasticity, but it was difficult to obtain blends since the polymer was low in compatibility. The polymer was also difficult to dissolve in organic solvents and was low in fluidity when hot, so that it was impossible to make the polymer into a film as by the inflation process.

COMPARATIVE EXAMPLE 6

Low-pressure polyethylene, 50,000 in molecular weight, was chlorinated to obtain chlorinated polyethylene containing 53.1 wt. % of chlorine. The polymer was made into a 2-mm-thick sheet in the same manner as in Example 1. The sheet was 392 kg/cm$^2$ in tensile strength and 63% in tensile elongation. The resin was low in rubberlike elasticity and had high hardness (JIS A) of 94.

The chlorinated polyethylene was dissolved in toluene as in Example 6, and the solution was applied to the same cotton fabric as used in Example 6. The coated sheet obtained had a rigid, inflexible and hard coating. When tested for thermal stability at an elevated temperature of 200° C. for 30 minutes, the sheet yellowed, released a stimulating odor and was not usable as an electrostatic printing material which must have heat resistance (160° to 185° C./min).

EXAMPLE 11 AND COMPARATIVE EXAMPLE 7

Using Canon NP5540 (monochromatic copying machine for use with four colors, product of Canon Inc.), a monochromatic (black) copy image was printed on the resin surface of the laminate sheet prepared in Example 5 and having a chlorinated polyethylene sheet.

In Example 11, the printed toner image was heat-treated at a temperature of 180° C. for 20 seconds in a constant-temperature chamber having a heater to fix the image to the sheet. The same procedure as above was repeated in Comparative Example 7 except that the heat treatment was not conducted.

The prints obtained were tested for the fixability of the printed image. Table 6 shows the results.

TABLE 6

| | Example 11 | Comp. Ex. 7 |
|---|---|---|
| Fixing condition | 180° C. × 20 sec | No heating |
| Print | | |
| Surface | Very glossy | Very glossy |
| Discoloration | No | No |
| Peel test | B | D |
| Folding test | | |
| I* | A | D |
| II* | A | D |

Note
*Folded with the printed surface out.
**Folded with the printed surface in.

EXAMPLES 12 and 13

The same procedure as in Example 6 was repeated in Example 12 except that low-pressure polyethylene with a molecular weight of 20,000 was used in place of the low-pressure polyethylene having a molecular weight of 30,000 and serving as the starting material, whereby a 2-mm-thick sheet was obtained.

A printing sheet was prepared from the sheet by the same coating and laminating procedures as in Example 6.

In Example 13, a 2-mm-thick sheet was prepared by the same procedure as in Example 6 using the same low-pressure polyethylene having a molecular weight of 30,000 as in Example 6. A printing sheet was prepared from this sheet by the same coating and laminating procedures as in Example 6.

Table 7 shows the properties of each 2-mm-thick sheet obtained by the first step of each of the examples.

TABLE 7

| | Example 12 | Example 13 |
|---|---|---|
| Chlorinated polyethylene | | |
| Molecular wt. of polyethylene | 20,000 | 30,000 |
| Chlorine content (wt. %) | 45.1 | 45.0 |
| Properties of sheet | | |
| Softening point (°C.) | 75 | 83 |
| Tensile strength (kg/cm$^2$) | 166 | 190 |
| Tensile elongation (%) | 430 | 420 |
| Tensile elastic modulus 100 ($\times$ 10$^2$ kg/cm$^2$) | 0.2 | 0.2 |
| Insulation breakdown voltage (kV/mm) | 19.0 | 19.0 |

The printing sheet of Example 12 was 0.18 mm in thickness, 152 g/m$^2$ in total weight and 40 g/m$^2$ in the weight of the coating. The printing sheet of Example 13 was 0.20 mm in thickness, 155 g/m$^2$ in weight and 38 g/m$^2$ in the weight of the coating. Both the sheets were 6.8 kV/mm in insulation breakdown voltage.

Using full color copying machine (Canon color Laser Copier-1), monochromatic yellow, red and blue images, an image of intermediate color, green, and a black image were copied on the resin surface of each sheet, which was then heat-treated for fixing at 180° C. for 20 seconds in a box-shaped constant-temperature chamber. The prints obtained were tested for the fixability of the printed images. Table 8 shows the results.

TABLE 8

| | Example 12 | | Example 13 | | |
|---|---|---|---|---|---|
| | Black | Yellow | Red | Blue | Green |
| Surface change | Very glossy | Do | Do | Do | Do |
| Discoloration | No | No | No | No | No |
| Peel test | A | A | A | A | A |

TABLE 8-continued

| | Example 12 | | Example 13 | | |
|---|---|---|---|---|---|
| | Black | Yellow | Red | Blue | Green |
| Folding test | | | | | |
| I* | A | A | A | A | A |
| II** | A | A | A | A | A |

Note
*Folded with the printed surface out.
**Folded with the printed surface in.

EXAMPLES 14

Low-pressure polyethylene, 120,000 in molecular weight and suspended in an aqueous medium, was chlorinated to obtain rubberlike chlorinated polyethylene containing 40.3 wt. % of chlorine.

One part by weight of lubricant was added to 100 parts by weight of the chlorinated polyethylene to obtain a compound, which was then kneaded with heat rolls at a temperature of 110° to 130° C. and thereafter made into a sheet. The sheet was subsequently pressed hot to prepare a 2-mm-thick sheet. This sheet was 85° C. in softening point, 185 kg/cm$^2$ in tensile strength, 700% in tensile elongation, $0.4\times10^2$ kg/cm$^2$ in tensile elastic modulus 100 and 18.5 kV/mm in insulation breakdown voltage.

A compound was prepared from 100 parts by weight of the chlorinated polyethylene, 30 parts by weight of ethylene-vinyl acetate copolymer ("EVAFLEX P2505," containing 25 wt. % of vinyl acetate, product of Mitsui-Du Pont Chemical Co., Ltd.), 10 parts by weight of titanium oxide and 30 parts by weight of heavy calcium carbonate. The compound was kneaded with heat rolls and then made into a 0.18-mm-thick film by a calender.

The film was placed over one side of a polyester plain weave fabric (52 warps/inch, 52 wefts/inch and 110 g/m$^2$ in weight), and the assembly was pressed hot to obtain a flexible white laminate sheet. The sheet was 0.22 mm in thickness and had a tensile strength of 57.5 kg/cm$^2$ in the warp direction and 39.4 kg/cm$^2$ in the weft direction, an elongation of 25% in the warp direction and 20% in the weft direction and an insulation breakdown voltage of 7.1 kV/mm.

Using Canon Laser Copier 1, a colorful desing illustration was copied on the resin surface of the sheet to obtain a printed color image as an accurate reproduction of the original. The print was heat-treated for fixing in a box-shaped constant-temperature chamber at a temperature of 170° C. for 30 seconds. The resulting image was tested for fixability. Table 9 shows the result.

TABLE 9

| | Example 14 |
|---|---|
| Fixing condition | 170° C. × 30 sec |
| Print | |
| Surface | Very glossy |
| Discoloration | No |
| Peel test | A |
| Folding test | |
| I* | A |
| II** | A |

TABLE 9-continued

| | Example 14 |
|---|---|
| Peel test*** | A |

Note
*Same as in Table 8
**Same as in Table 8.
**The test piece was entirely held immersed in tap water for 3 months, then withdrawn from the water, wiped with cloth to remove the water, dried at room temperature for 48 hours and thereafter tested.

EXAMPLE 15

Low-pressure polyethylene, 20,000 in molecular weight and suspended in an aqueous medium, was chlorinated to obtain chlorinated polyethylene containing 23.0 wt. % of chlorine. The polymer obtained was 263 kg/cm$^2$ in tensile strength, 570% in tensile elongation, 113° C. in softening point, 20 kV/mm in insulation breakdown voltage and $0.8\times10^4$ kg/cm$^2$ in tensile elastic modulus.

A compound was prepared from 100 parts by weight of the chlorinated polyethylene, 25 parts by weight of ethylene-vinyl acetate copolymer (the same as the one used in Example 14), 6 parts by weight of titanium oxide and 25 parts by weight of heavy calcium carbonate. The compound was kneaded with heat rolls and then made into a 0.18-mm-thick film by a calender. The film was placed over the specified PPC paper, and the assembly was pressed hot to obtain a laminate sheet, which was 6.1 kV/mm in insulation breakdown voltage.

A stock quotation column on newspaper was copied on the resin surface of the laminate sheet using Fuji Xerox 4790 (product of Fuji Xerox Co., Ltd.). The print was heat-fixed in a box-shaped constant-temperature chamber at a temperature of 175° C. for 20 seconds. The minute characters of the original were found to have been reproduced on the print with high accuracy. Table 10 shows the result obtained by testing the print for fixability of the image.

TABLE 10

| | Example 9 |
|---|---|
| Fixing condition | 175° C. × 20 sec |
| Print | |
| Surface | Very glossy |
| Discoloration | No |
| Peel test | A |
| Folding test | |
| I* | A |
| II** | A |

Note
*Same as in Table 8.
**Same as in Table 8.

What is claimed is:

1. A printing material comprising a film or sheet prepared from a chlorinated polyethylene containing 10 to 50 wt. % of chlorine and obtained by chlorinating a polyethylene having a molecular weight of 10,000 to 200,000, by a solution method or aqueous suspension method, or from a polymer mixture containing the chlorinated polyethylene.

2. A printing material as defined in claim 1 wherein the molecular weight of the polyethylene is 10,000 to 100,000.

3. A printing material as defined in claim 1 wherein the chlorinated polyethylene contains 20 to 45 weight % of chlorine.

4. A printing material as defined in claim 1 wherein the polymer mixture contains at least 20 weight % of the chlorinated polyethylene.

5. A printing material as defined in claim 1 wherein the chlorinated polyethylene or the polymer mixture is an elastic material having a tensile strength of at least 100 kg/cm$^2$, a tensile elongation of at least 100% and a softening point of at least 60° C., the printing material having an insulation breakdown voltage of at least 500 V/mm and being useful for electrostatic printing.

* * * * *

UNITED STATES PATENT AND TRADEMARK OFFICE

CERTIFICATE OF CORRECTION

PATENT NO. : 5,089,316

DATED : February 18, 1992

INVENTOR(S) : SASAKI et al

It is certified that error appears in the above-identified patent and that said Letters Patent is hereby corrected as shown below:

On the cover page, in line 3 of item [75], delete "Suita" and substitute therefor --Amagasaki--.

Signed and Sealed this

Twenty-first Day of September, 1993

Attest:

BRUCE LEHMAN

Attesting Officer

Commissioner of Patents and Trademarks